United States Patent
Louvau et al.

(10) Patent No.: US 11,663,245 B2
(45) Date of Patent: May 30, 2023

(54) INITIAL LOADING OF PARTIAL DEFERRED OBJECT MODEL

(71) Applicant: Microsoft Technology Licensing, LLC, Redmond, WA (US)

(72) Inventors: Scott M. Louvau, Redmond, WA (US); Michael C. Fanning, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/912,386

(22) Filed: Jun. 25, 2020

(65) Prior Publication Data

US 2021/0406289 A1 Dec. 30, 2021

(51) Int. Cl.
*G06F 7/00* (2006.01)
*G06F 16/28* (2019.01)
*G06F 16/22* (2019.01)
*G06F 16/84* (2019.01)

(52) U.S. Cl.
CPC ........ *G06F 16/289* (2019.01); *G06F 16/2272* (2019.01); *G06F 16/86* (2019.01)

(58) Field of Classification Search
CPC .... G06F 16/289; G06F 16/2272; G06F 16/86; G06F 16/84; G06F 8/315; G06F 9/4488; G06F 16/315; G06F 16/4488; G06F 8/35; G06F 8/34; G06F 11/368; G06F 11/3684
See application file for complete search history.

(56) References Cited

U.S. PATENT DOCUMENTS

| | | | | |
|---|---|---|---|---|
| 8,244,775 | B1* | 8/2012 | Bak | G06F 9/4488 707/802 |
| 9,503,123 | B1* | 11/2016 | Pinho | G06N 5/04 |
| 10,833,702 | B1 | 11/2020 | Margalit et al. | |
| 2006/0117061 | A1* | 6/2006 | Weiss | G06F 40/151 |
| 2007/0005622 | A1* | 1/2007 | Fernandes | G06F 40/143 |
| 2007/0234199 | A1* | 10/2007 | Astigeyevich | G06F 40/143 715/234 |

(Continued)

OTHER PUBLICATIONS

"Gzip", Retrieved From: https://en.wikipedia.org/w/index.php?title=Gzip&oldid=949952083, Apr. 9, 2020, 4 Pages.

(Continued)

*Primary Examiner* — Mohammad A Sana
(74) *Attorney, Agent, or Firm* — Workman Nydegger

(57) ABSTRACT

Partial initial construction of a deferred object model. This is done using a map that correlates positions of a hierarchically structured definition and corresponding hierarchical positions within an object model. The map is accessed and used to initially construct a deferred object model that even leaves some of the deferred objects unpopulated. The map is used to determine which parts of the hierarchical object definition no longer need to be parsed in order to construct this initial form of the deferred object model. If a request for an object is detected at some point after the initial construction, and that requested object is not represented even in deferred form in the deferred object model, the system uses the map to find the position of the corresponding object definition in the hierarchical object definition. At that point, the system parses that position, and constructs the object.

21 Claims, 12 Drawing Sheets

(56) References Cited

U.S. PATENT DOCUMENTS

| | | | |
|---|---|---|---|
| 2009/0006450 A1* | 1/2009 | Champion | G06F 9/4493 |
| 2012/0133532 A1 | 5/2012 | Hunt et al. | |
| 2012/0143927 A1 | 6/2012 | Hill et al. | |
| 2013/0298108 A1 | 11/2013 | Oliver | |
| 2015/0234841 A1* | 8/2015 | Hebert | G06F 16/2282 |
| | | | 707/703 |
| 2019/0251189 A1 | 8/2019 | Vanderspek et al. | |
| 2020/0019332 A1* | 1/2020 | Danilov | G06F 11/1076 |
| 2021/0019093 A1* | 1/2021 | Karr | G06F 3/0685 |
| 2021/0357379 A1 | 11/2021 | Louvau et al. | |

OTHER PUBLICATIONS

Galende, Robertos. , "Gztool", Retrieved From: https://github.com/circulosmeos/gztool/blob/d2590dea6bb5ed96ec2eb65720f2c5001c4e2c2d/README.md, Apr. 19, 2020, 15 Pages.

"International Search Report and Written Opinion Issued in PCT Application No. PCT/US21/026739", dated Jul. 19, 2021, 11 Pages.

"International Search Report and Written Opinion Issued in PCT Application No. PCT/US21/032124", dated Aug. 16, 2021, 11 Pages.

"Non Final Office Action Issued in U.S. Appl. No. 16/876,990", dated Mar. 22, 2022, 15 Pages.

"Final Office Action issued in U.S. Appl. No. 16/876,990", dated Sep. 28, 2022, 16 Pages.

U.S. Appl. No. 16/876,990, filed May 18, 2020.

"Notice of Allowance issued in U.S. Appl. No. 16/876,990", dated Feb. 9, 2023, 10 Pages.

Hunt, et al., "Delta algorithms: An empirical analysis", In Journal of ACM Transactions on Software Engineering and Methodology, vol. 7, Issue 2, Apr. 1, 1998, pp. 192-214.

Lakshminarasimhan, et al., "Isabela for effective in situ compression of scientific data", In Journal of Concurrency and Computation Practice and Experience, vol. 25, Issue 4, Jul. 11, 2012, pp. 524-540.

* cited by examiner

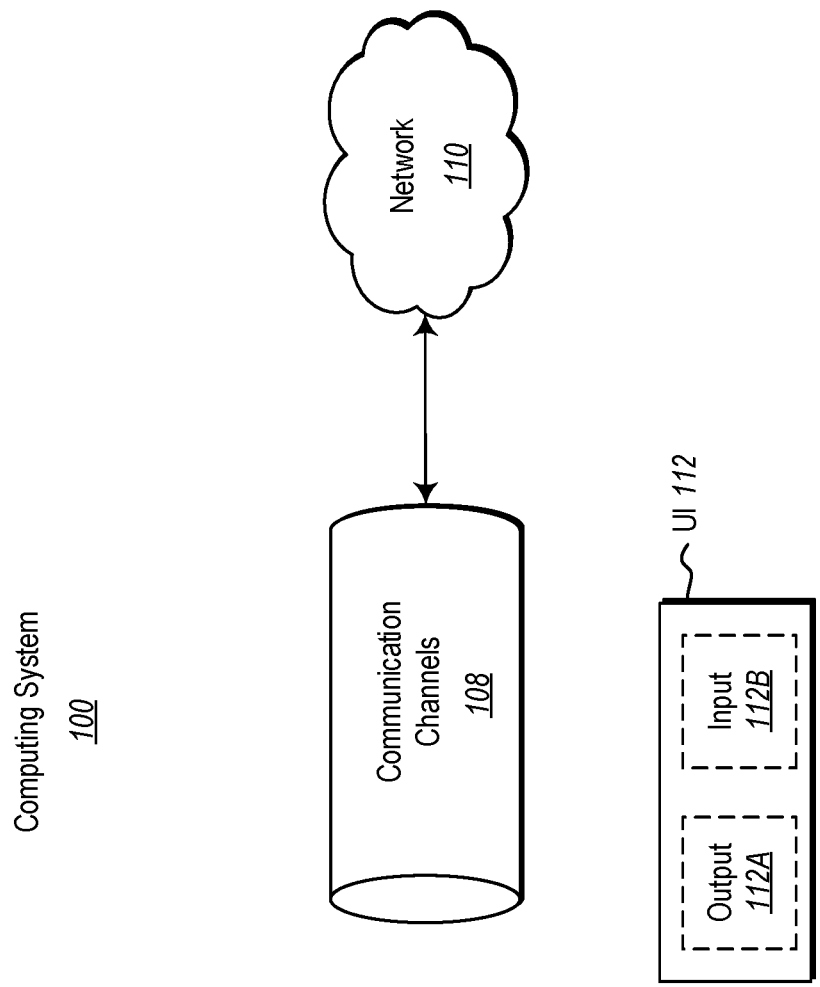
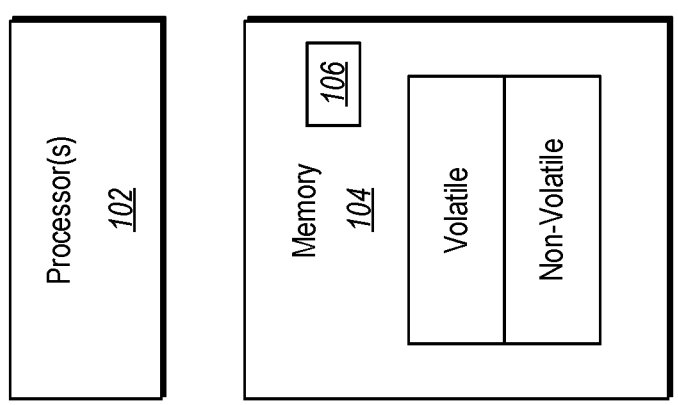
FIG. 1

200
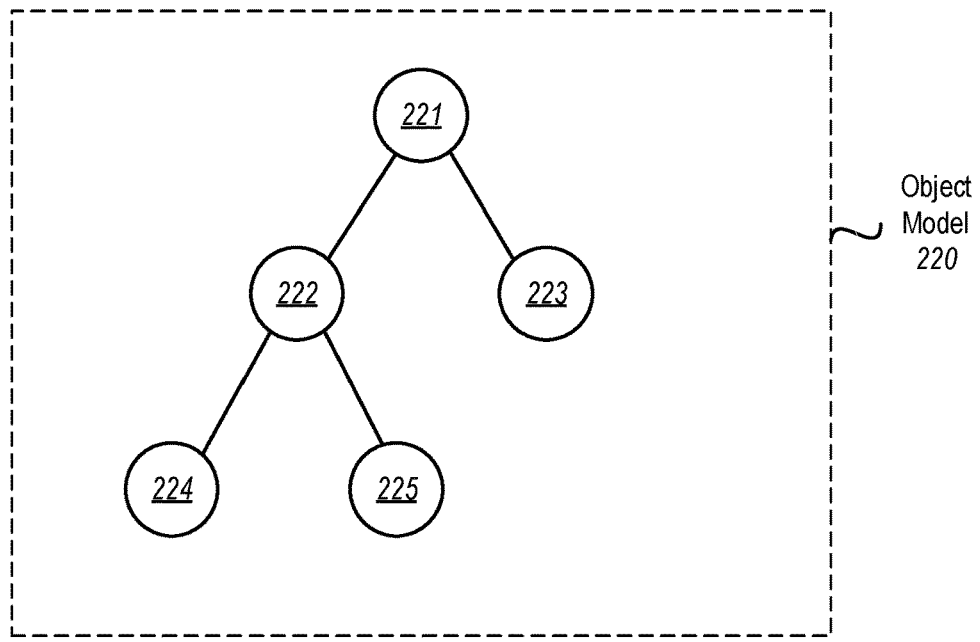
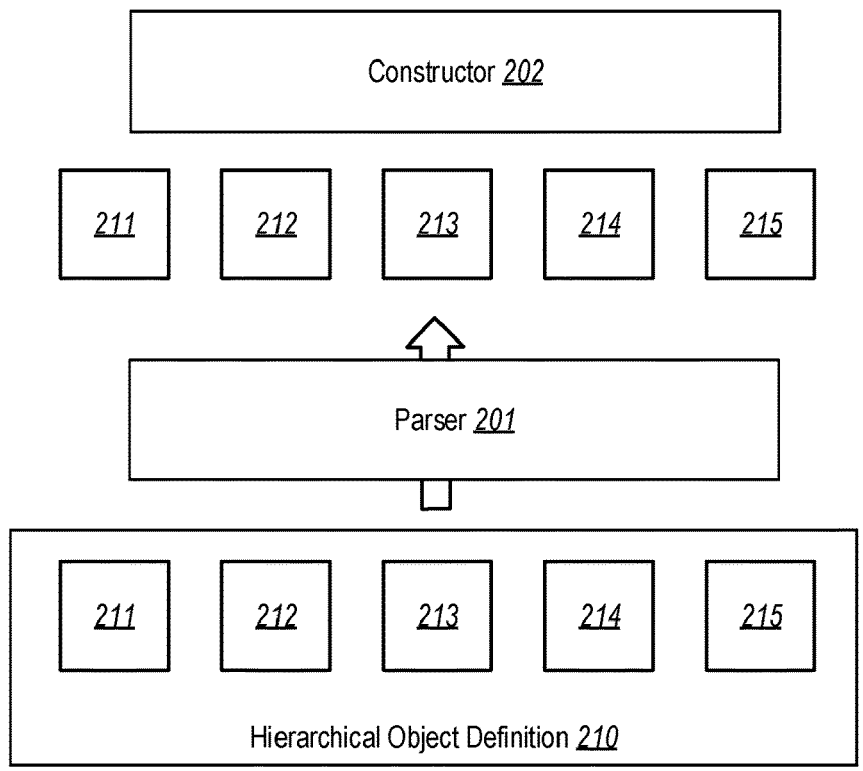
*FIG. 2*
*PRIOR ART*

*400B*
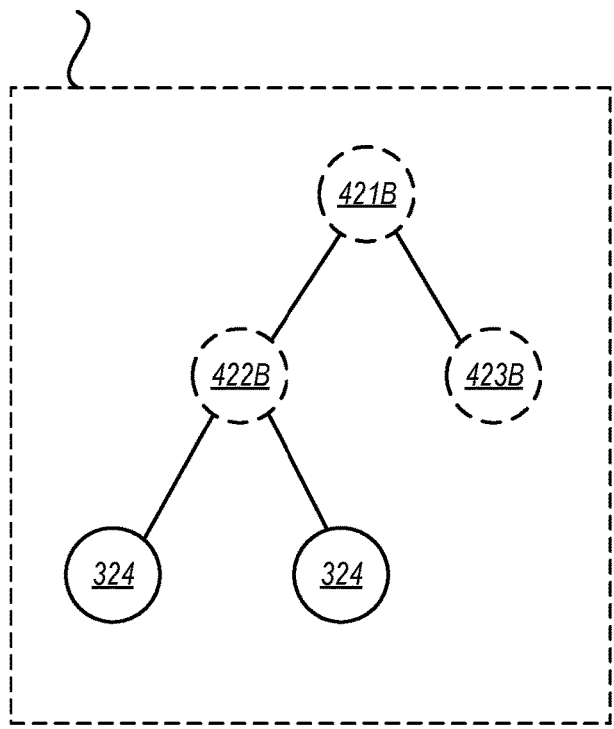
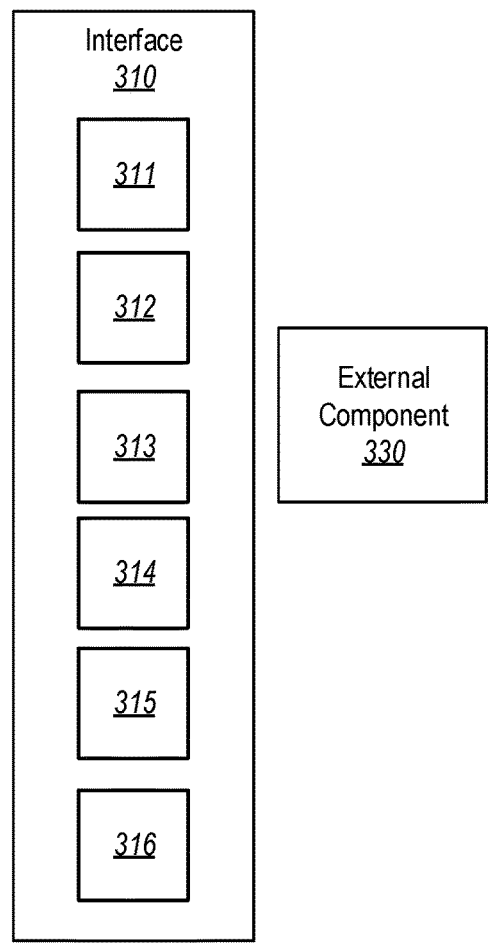
FIG. 4B
*PRIOR ART*

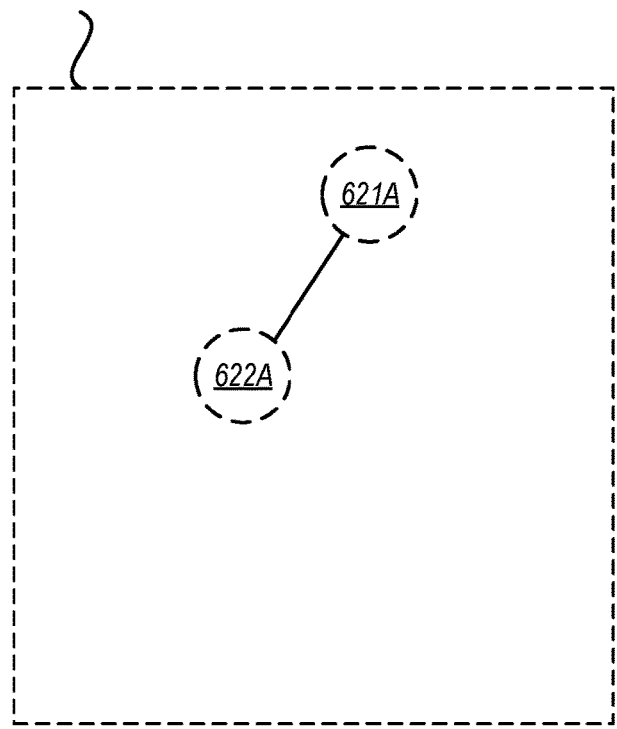
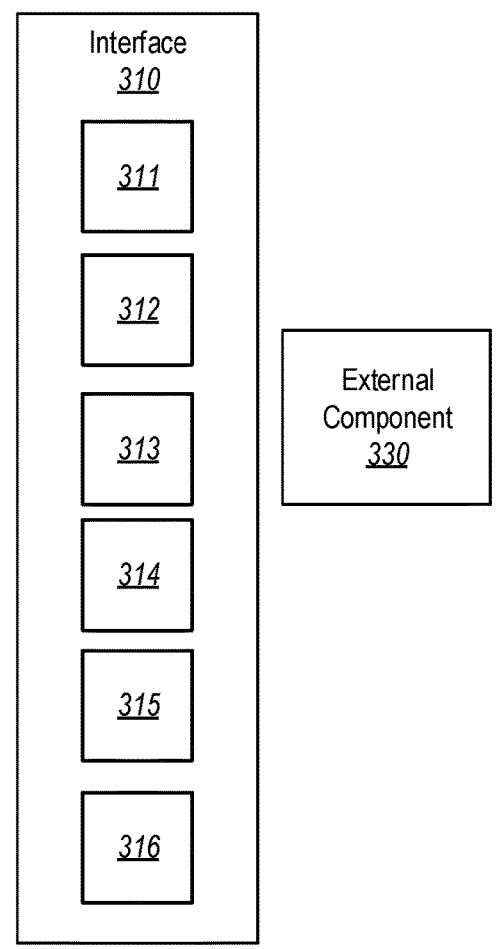
FIG. 6A

*600B*
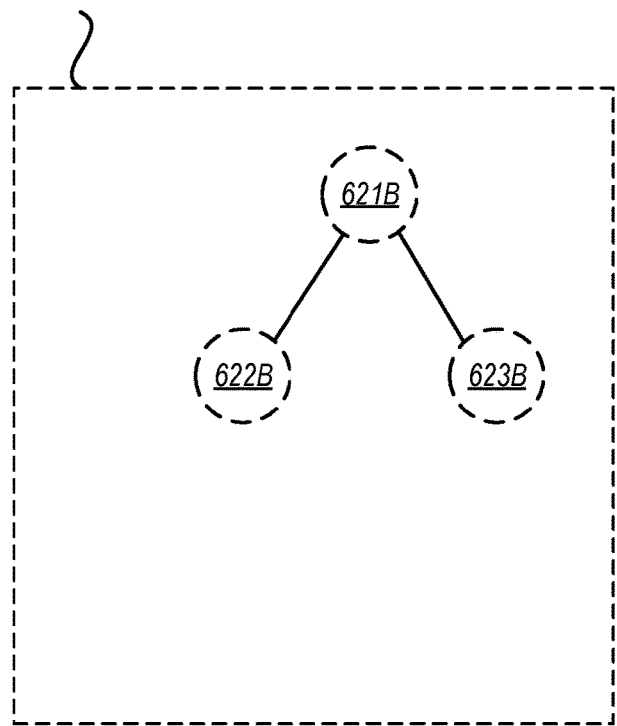
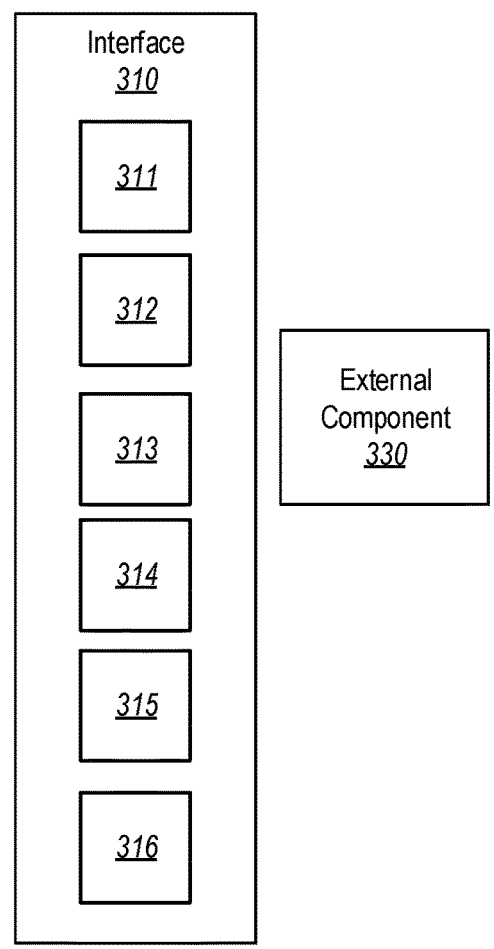
*FIG. 6B*

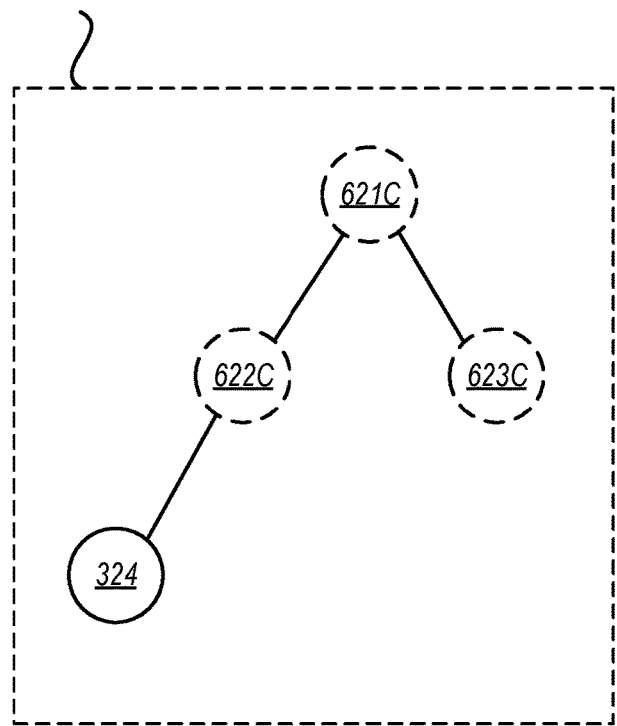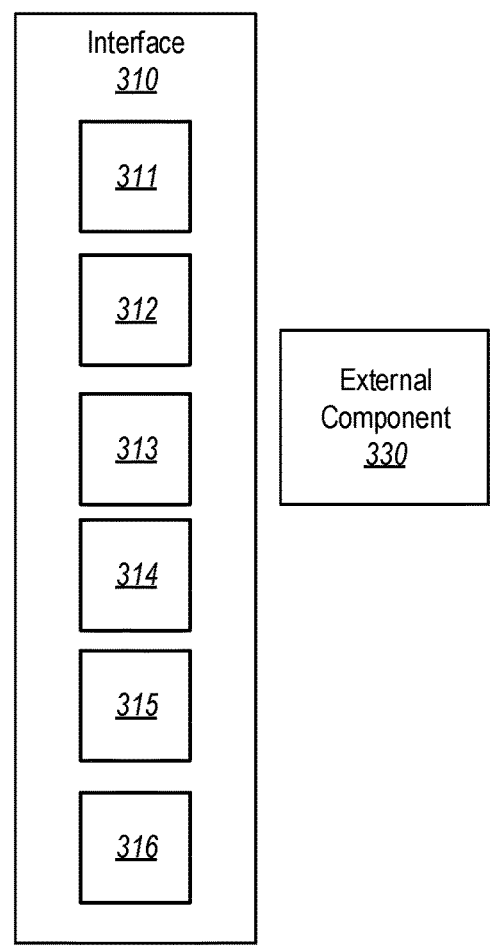
*FIG. 6C*

INITIAL LOADING OF PARTIAL DEFERRED OBJECT MODEL

BACKGROUND

Computing systems most typically operate at the direction of object-oriented programs. Such a program may include an object model to represent a data set in memory. The program can then use the data set by using an interface to interact with the corresponding object model. Object models can often be quite large, perhaps even an order of magnitude larger than the size of the stored data that they represent. Accordingly, it is difficult and perhaps impossible to have the entire object model of larger data sets in the memory of a computing system.

In such cases, the object model can be represented at least partially in deferred form within memory. An object represented in deferred form can still be interfaced with using the interface of the object model. The caveat is that in order for the object itself to operate, the deferred form of the object would be replaced with the actual object in the object model. Thus, deferred object models allow for larger object models to be interfaced with without requiring all objects of the object model be always loaded in the memory of the computing system.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Deferred object models are object models in which some or all of the objects within the object model are not fully represented within the object model in memory. Instead, the object is represented in deferred form. A deferred object may still be interfaced with using the interface of the object model and thus the appearance to the caller is as if the corresponding object is loaded into memory. The deferred object is used to acquire the actual object, which is then populated into the object model taking the deferred object's place prior to the object being able to function. Deferred objects take very little space in memory, as they only contain enough information to retrieve the real data when needed. Thus, deferred object models make more efficient use of the memory of a computing system.

However, previously, in order to construct a deferred object model based on a hierarchical object definition, the hierarchical object definition still would conventionally be fully parsed to obtain the object definitions, and then a constructor would construct at least the deferred form of the object into the deferred object model. Since such hierarchical object definitions can be quite large, this parsing can take significant time. Thus, even though deferred object models save significant memory space, conventional deferred object models still take significant time to load into memory.

The principles described herein allow the deferred object model to be initially constructed in partial form, while still being operational. This is done using a map that correlates positions of a hierarchically structured definition and corresponding hierarchical positions within an object model. The hierarchical object definition includes object definitions that each describe a corresponding object of the object model. An object model can be constructed by parsing the hierarchical object definition, and populating the resulting objects into their proper hierarchical position within the object model (or populating the resulting deferred object into the same position within a deferred object model).

In accordance with the principles described herein, the map is accessed and used to initially construct a deferred object model that may leave some of the deferred objects unpopulated. The map is used to determine which parts of the hierarchical object definition no longer need to be parsed in order to construct this initial form of the deferred object model. Since not all of the hierarchical object definition needs to be parsed at initial construction time, the load time of the deferred object model can be significantly reduced.

If a request for an object is detected at some point after the initial construction of the deferred object model, and that requested object is not represented even in deferred form in the deferred object model, the system uses the map to find the position of the corresponding object definition in the hierarchical object definition. At that point, the system parses that position, and constructs the object. The deferred object model can then respond to the request since the object is available in memory. The object can either stay within the deferred object model, or perhaps the object can be discarded after use with a deferred form of the object remaining now within the deferred object model. Of course, similar to conventional deferred object models, if an object is requested, and that object is represented in deferred form within the deferred object model, that deferred form can be used to obtain the actual object and thus respond to the request.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which:

FIG. 1 illustrates an example computing system in which the principles described herein may be employed;

FIG. 2 illustrates a conventional environment in which a hierarchical object definition is used to construct an object model;

FIG. 4B illustrates an environment in which the deferred object model includes objects that represent a mix of deferred forms and actual forms of the objects of the standard object model of FIG. 3;

FIG. 6A illustrates a deferred object model that is only partially populated with deferred objects;

FIG. 6B illustrates a deferred object model that is only partially populated with deferred objects, but which includes one more deferred object as compared to FIG. 6A;

FIG. 6C illustrates a deferred object model that is only partially populated with deferred objects, but which includes one more actual object as compared to FIG. 6B;

DETAILED DESCRIPTION

Figure 3:
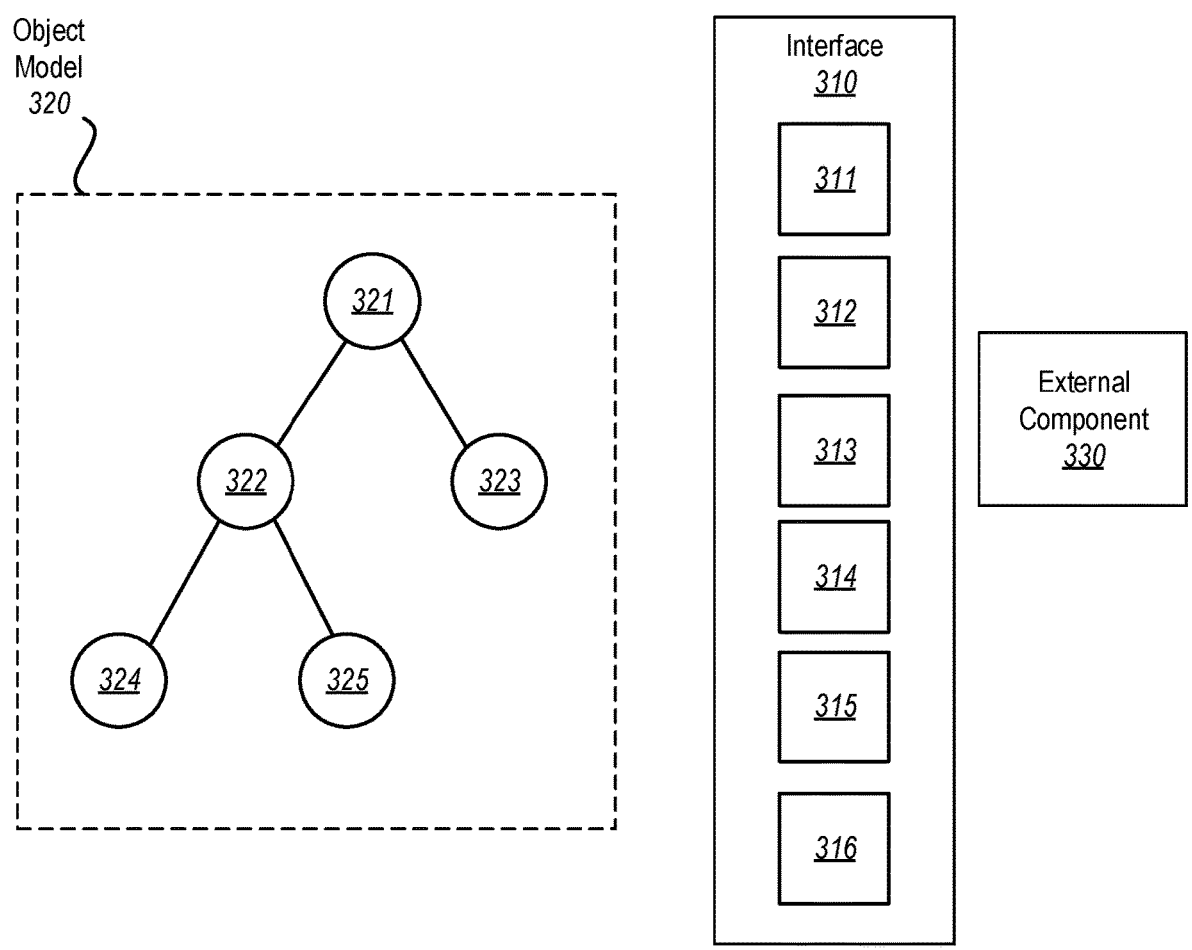
FIG. 3 illustrates an example object model environment that includes an object model and an interface for interfacing with the object model.

Deferred object models are object models in which some or all of the objects within the object model are not fully represented within the object model in memory. Instead, the object is represented in deferred form. A deferred object may still be interfaced with using the interface of the object model and thus the appearance to the caller is as if the corresponding object is loaded into memory. The deferred object is used to acquire the actual object, which is then populated into the object model taking the deferred object's place prior to the object being able to function. Deferred objects take very little space in memory as they only contain enough information to retrieve the real data when needed. Thus, deferred object models make more efficient use of the memory of a computing system.

However, previously, in order to construct a deferred object model based on a hierarchical object definition, the hierarchical object definition still would conventionally be fully parsed to obtain the object definitions, and then a constructor would construct at least the deferred form of the object into the deferred object model. Since such hierarchical object definitions can be quite large, this parsing can take significant time. Thus, even though deferred object models save significant memory space, conventional deferred object models still take significant time to load into memory.

The principles described herein allow the deferred object model to be initially constructed in partial form, while still being operational. This is done using a map that correlates positions of a hierarchically structured definition and corresponding hierarchical positions within an object model. The hierarchical object definition includes object definitions that each describe a corresponding object within the object model. An object model can be constructed by parsing the hierarchical object definition, and populating the resulting objects into their proper hierarchical position within the object model (or populating the resulting deferred object into the same position within a deferred object model).

In accordance with the principles described herein, the map is accessed and used to initially construct a deferred object model that may leave some of the deferred objects unpopulated. The map is used to determine which parts of the hierarchical object definition no longer need to be parsed in order to construct this initial form of the deferred object model. Since not all of the hierarchical object definition needs to be parsed at initial construction time, the load time of the deferred object model can be significantly reduced.

If a request for an object is detected at some point after the initial construction of the deferred object model, and that requested object is not fully represented even in deferred form in the deferred object model, the system uses the map to find the position of the corresponding object definition in the hierarchical object definition. At that point, the system parses that position, and constructs the object. The deferred object model can then respond to the request since the object is available in memory. The object can either stay within the deferred object model, or perhaps the object can be discarded after use with a deferred form of the object remaining now within the deferred object model. Of course, similar to conventional deferred object models, if an object is requested, and that object is represented in deferred form within the deferred object model, that deferred form can be used to obtain the actual object and thus respond to the request.

Because the principles described herein are performed in the context of a computing system, some introductory discussion of a computing system will be described with respect to FIG. 1. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 includes at least one hardware processing unit 102 and memory 104. The processing unit 102 includes a general-purpose processor. Although not required, the processing unit 102 may also include a field programmable gate array (FPGA), an application specific integrated circuit (ASIC), or any other specialized circuit. In one embodiment, the memory 104 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the claims, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within an FPGA or an ASIC, the computer-executable instructions may be hard-coded or hard-wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, virtual or augmented reality, holograms and so forth. Examples of input mechanisms 112B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "NIC"), and then be eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

Now that a computing system has been described generally with respect to FIG. 1, an introduction of object models will be described with respect to FIGS. 2 and 3, and then deferred object models will be described with respect to FIGS. 4A and 4B. Then, the description will proceed into the principles of the present invention with respect to FIG. 5 and subsequent figures.

The formulation of an object model using a hierarchical object definition will be now described with respect to FIG. 2. An example of a hierarchical object definition is a JSON document. JSON documents are text documents that are stored representations of a dataset and that are conventionally parsed so that the objects described therein can be constructed into an object model in memory. However, the principles described herein are not limited to the format of the hierarchical object definition. As an example, the hierarchical object definition may be structured in text form in a markup language document, such as an eXtensible Markup Language (XML) document, a HyperText Markup Language (HTML) document, or any other text document. The hierarchical object definition may also be in a non-text format, such as in binary (e.g., binary JSON or any other binary format).

The object model is an in-memory representations of the dataset but is in a form that program components can interface with at runtime. As an example only, FIG. 2 illustrates a conventional environment 200 in which a hierarchical object definition 210 is used to construct an object model 220. The hierarchical object definitions 210 includes multiple object definitions. Each object definition contains sufficient information for a constructor to construct an object and place the object into its proper position within the hierarchy of an object model. As an example, the hierarchical object definition 210 includes five object definitions 211 through 215.

To formulate the object model, a parser first parses the object definitions from the hierarchical object definition. In FIG. 2, for example, the parser 201 parses the object definitions 211 through 215 from the hierarchical object definition 210, and provides the object definitions 211 through 215 to a constructor 202. The constructor then uses the object definitions to construct corresponding objects and place those objects in their proper position within an object model. As an example, in FIG. 2, the constructor 202 constructs object 221 using the corresponding object definition 211, and also uses the object definition 211 to determine where to place the object 221 within an object model 220. The constructor 202 likewise uses object definitions 212 through 215 to construct corresponding objects 222 through 225 and place those objects within the object model 220.

An object model is a collection of related objects that can be interfaced with by other components in a computing system. FIG. 3 illustrates an example object model environment 300 that includes an object model 320 and an interface 310. In this example, the object model 320 has five objects 321 through 325 that are hierarchically related as shown. A typical object model can have countless related objects, and so the object model 320 is used only for illustrative purposes and in simplified form. In this example, the interface 310 is shown as including six methods 311 through 316 that an external component 330 can perform on one, some or all of the objects in the object model 320. Such an object model will be referred to as a "standard" object model as each of the objects 321 through 325 are already instantiated within the object model in memory.

A deferred object model corresponding to a standard object model can still be interfaced with using the same interface used to interface with the standard object model. However, one or more of the objects are loaded only in deferred form. That is, the deferred object can still receive an instruction to operate. However, before the instruction can proceed, the deferred form of the object is used to load the actual object into memory. Once the object performs as instructed, the object can either be kept in memory in case called upon again, or discarded to preserve memory. The deferred form of an object is much smaller than the corresponding object. Accordingly, deferred object models are helpful as they retain the appearance of the object model since the interface stays the same as it would be for a standard object model, and since the objects can still be accessed via the deferred form of the object. Accordingly, deferred object models of even large object models are more likely to fit within memory.

Figure 4A:
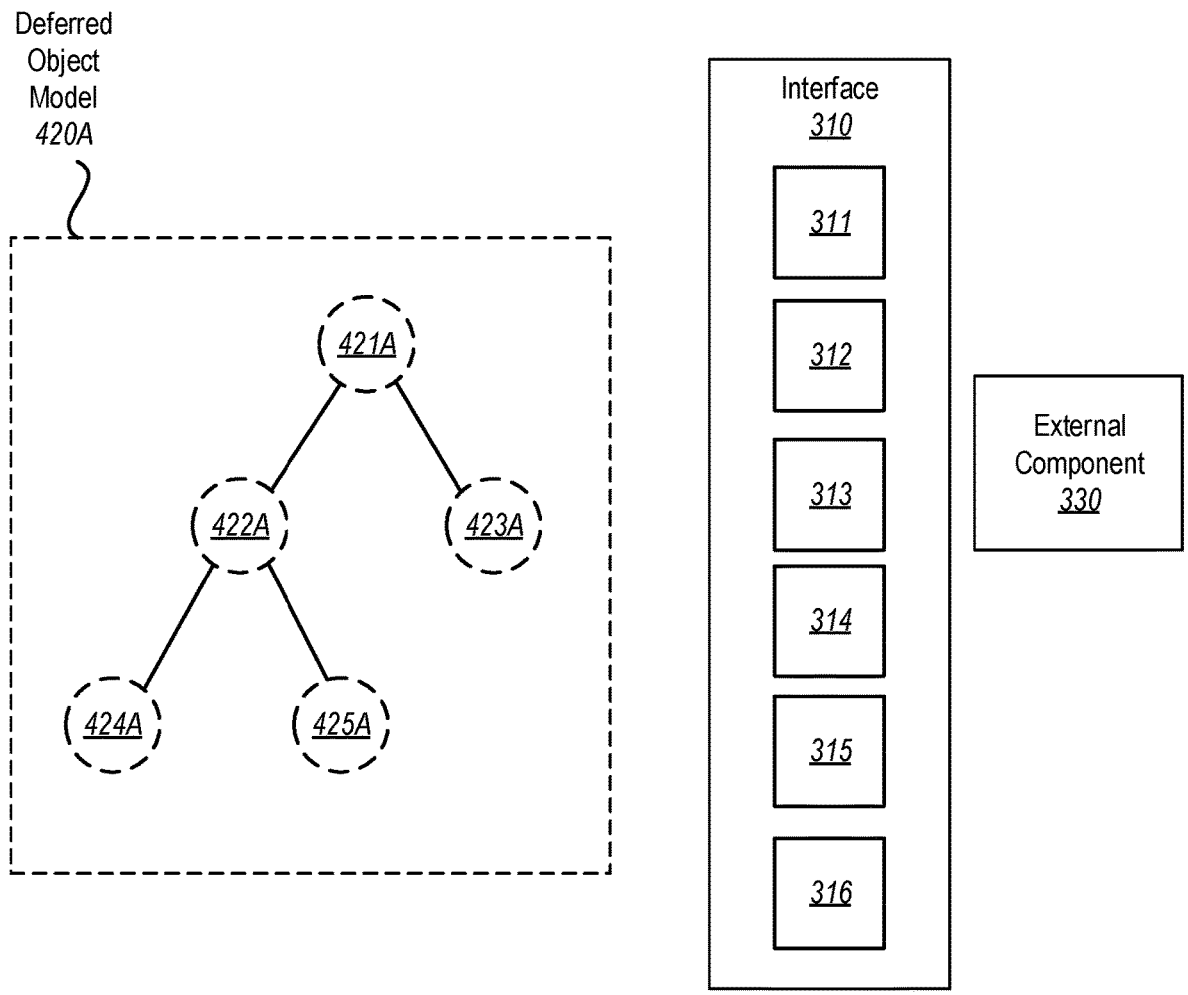
FIG. 4A shows an example environment in which a deferred object model includes deferred objects that represent deferred forms for each of the corresponding objects of the standard object model of FIG. 3.

FIGS. 4A and 4B illustrate an example environment 400A and 400B that are each the same as the environment 300 of FIG. 3, except that a deferred object model 420A and 420B, respectively, corresponding to the standard object model 320 is used. Note that there is no difference in the interface 310 of FIGS. 4A and 4B as compared to the interface 310 of FIG. 3. Thus, the other components (e.g., external component 330) need not actually operate any differently depending on whether they are using a deferred object model or a standard object model. In the convention of FIGS. 3, 4A and 4B, deferred objects are represented as circles having dashed-lined circumferences, whereas the corresponding actual object is represented as circles having solid-lined circumferences. Thus, in FIG. 3, the objects 321 through 325 are represented with solid lines.

FIG. 4A shows an example environment 400A in which the deferred object model 420A includes deferred objects 421A through 425A for each of the corresponding objects 321 through 325 of the standard object model 320 of FIG. 3. This is represented by the deferred objects 421A through 425A having dashed-lined borders. Thus, the example deferred object model 420A is a simple example in which all of the objects of the object model are represented in deferred form.

However, a deferred object model can also have a mix of deferred and standard objects. FIG. 4B illustrates an environment 400B in which the deferred object model 420B includes deferred objects 421B through 423B that represent deferred forms of corresponding standard objects 321 through 323 of the corresponding standard object model 320 of FIG. 3. However, the deferred object model 420B also includes the actual objects 324 and 325 of the standard object model 320 of FIG. 3.

In fact, the deferred object model 420B may be arrived at should an external component 330 have used the interface 310 of FIG. 4A to invoke objects 324 and 325. In that case, the deferred form 424A of the object 324 would be used to load the object 324 into its proper place within the deferred object model 420B. In addition, the deferred form 425A of the object 325 would be used to load the object 325 into its proper place within the deferred object model 420B. That said, the standard objects could also be discarded allowing their deferred forms to take their place again. Thus, the population of standard objects within a deferred object model can fluctuate in order to effectively and judiciously use available memory resources.

Figure 5:
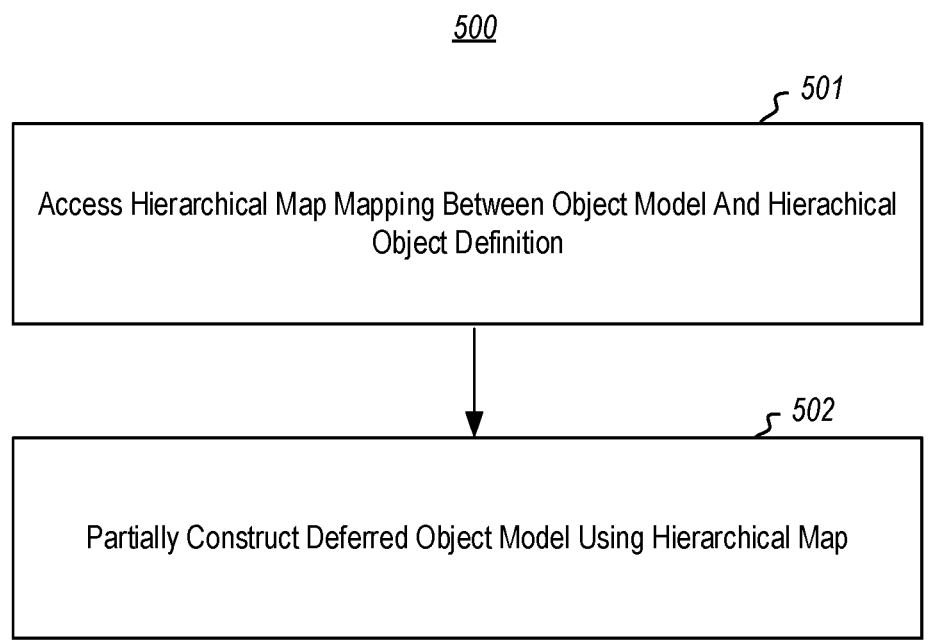
FIG. 5 illustrates a flowchart of a method for loading a deferred object model from a hierarchical object definition that defines the deferred object model, in accordance with the principles described herein.

FIG. 5 illustrates a flowchart of a method 500 for loading a deferred object model from a hierarchical object definition that defines the deferred object model, in accordance with the principles described herein. The method 500 includes accessing a map that correlates positions of a hierarchical object definition and corresponding hierarchical positions within an object model (act 501). In addition, a partial deferred object model is initially constructed using the accessed map (act 502).

In the conventional loading of object models, regardless of whether a deferred object model or a standard object model is being loaded, the hierarchical object definition that defines the object model is entirely parsed. In accordance with the principles described herein, the initial load time of the deferred object model is reduced as only some deferred objects are constructed and populated into the deferred object model upon initial construction. Thus, only some of the hierarchical object definition is parsed in order to complete the initial construction of the deferred object model. The hierarchical map correlates positions within the hierarchical object definition and hierarchical positions of the deferred object model permits this.

FIGS. 6A through 6C also illustrate example environments 600A through 600C that show deferred object models that can be interfaced through the same user interface 310 as used to interface with the standard object model 320 of FIG. 3, or the deferred object models 420A and 420B of respective FIGS. 4A and 4B. Furthermore, the respective deferred object models 620A through 620C do still correspond to the standard object model 320 of FIG. 3 in this example. However, the deferred object models 620A through 620C are quite different than conventional deferred object models in that not all objects of the corresponding standard object model 310 are fully represented (even in deferred form) within the deferred object model.

For example, in FIG. 6A, the deferred object model 620A includes deferred object 621A that is a deferred form of object 321 and could be used to load object 321 into memory. In addition, the deferred object model 620A includes deferred object 622A that is a deferred form of object 322 and thus could be used to load object 322 into memory. However, there is no full representation of objects 313 through 315 (not even in deferred form) within the deferred object model 620A. Thus, as things stand in the environment 600A, the deferred object model 620A could not be used to load any of the objects 323, 324 or 325 into memory.

As another example, in FIG. 6B, the deferred object model 620B is the same as the deferred object model 620A of FIG. 6A, except that the deferred object model 620B includes a deferred object 623B that is a deferred form of object 323, and thus could be used to load object 323 into memory. However, there is still no full representation of objects 324 and 325 (even in deferred form) in the deferred object model 620B. The deferred objects 621B and 622B could be the same as the deferred objects 621A and 622A of FIG. 6A, and can likewise be used to load respective objects 321 and 322 into memory.

In FIG. 6C, the deferred object model 620C is similar to the deferred object model 620B of FIG. 6B, except that object 324 is also loaded into the deferred object model 620B, in its proper place. Thus, the deferred object model 620C includes a mix of deferred objects and standard objects, but still the deferred object model 620C lacks full representation of the object 325, even in deferred form. The deferred objects 621C through 623C could be the same as the deferred objects 621B through 623B of FIG. 6B, and can likewise be used to load respective objects 321 through 323 into memory.

Figure 7:
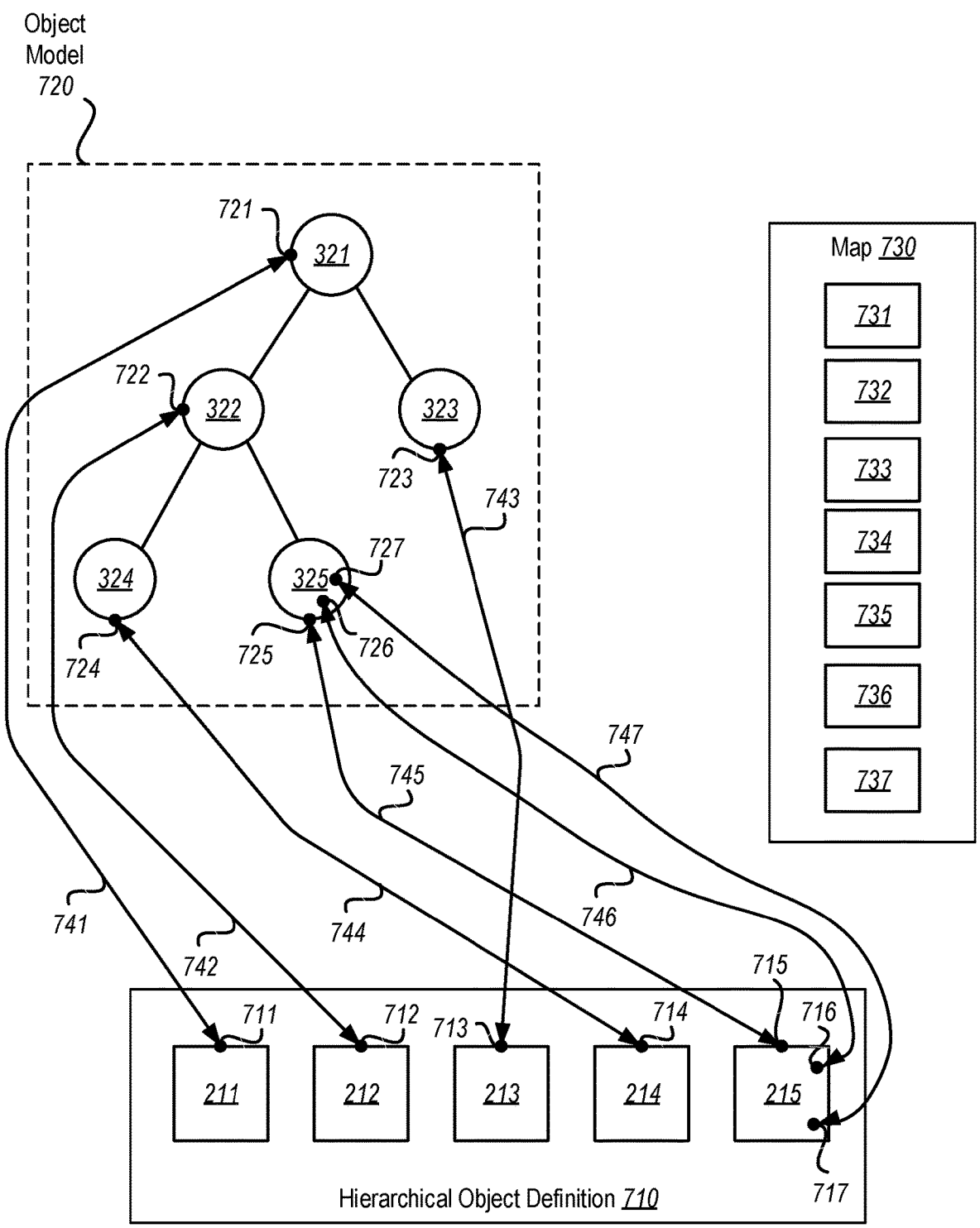
FIG. 7 illustrates an example environment that includes a map that correlates positions between a hierarchical object definition and an object model, in accordance with the principles described herein.

Referring back to FIG. 5, the method 500 includes accessing a map that correlates positions of a hierarchical object definition and corresponding hierarchical positions within an object model (act 501). FIG. 7 illustrates an example environment 700 that correlates positions between a hierarchical object definition 710 and an object model 720. In this example, the hierarchical object definition 710 is structured the same as the hierarchical definition 210 of FIG. 2, and also includes object definitions 211 through 215. Also in this example, the object model 720 is structured the same as the object model 320 of FIG. 3, and includes objects 321 through 325.

The map 730 is illustrated as including entries 731 through 737. Each entry correlates a position of the hierarchical object definition 710 and corresponding positions of the object model 720. As an example, entry 731 correlates (as represented by bi-directional arrow 741) the position 711 of the object definition 710 and corresponding position 721 of the object model 720. Likewise, each of the bi-directional arrows 742 through 747 represent the correlation of respective entries 732 through 737 between respective positions 712 through 717 of the hierarchical object definition 710 and corresponding positions 722 through 727 of the object model 720.

In this example, suppose that positions 711 through 715 include the position of the entirety of the corresponding object definitions 211 through 215, and that positions 721 through 725 correspond to the entirety of the objects 321 through 325 in the object model 320. Thus, the map 730 can include an index entry that is dedicated to a particular object and object definition. However, the positions 716 and 717 correspond to positions within the object definition 215, and likewise positions 726 and 727 correspond to positions within the object 325 of the object model. Thus, the map 730 could include an index entry containing larger object definitions (e.g., for objects larger than a predetermined threshold such as 32 kilobytes), smaller objects such that no two entries are more than a predetermined distance apart (e.g., 32 kilobytes in the hierarchical object definition), or a combination thereof.

Referring back to FIG. 5, the system initially constructs a deferred object model of the object model using the accessed map to parse only a subset of the plurality of object definitions included in the hierarchical object definition, thereby constructing only some deferred objects of the deferred object model (act 502). As an example, the deferred object model 620A of FIG. 6A includes deferred objects 621A and 622A, but includes no representation at all of objects 323 through 325.

Figure 8:
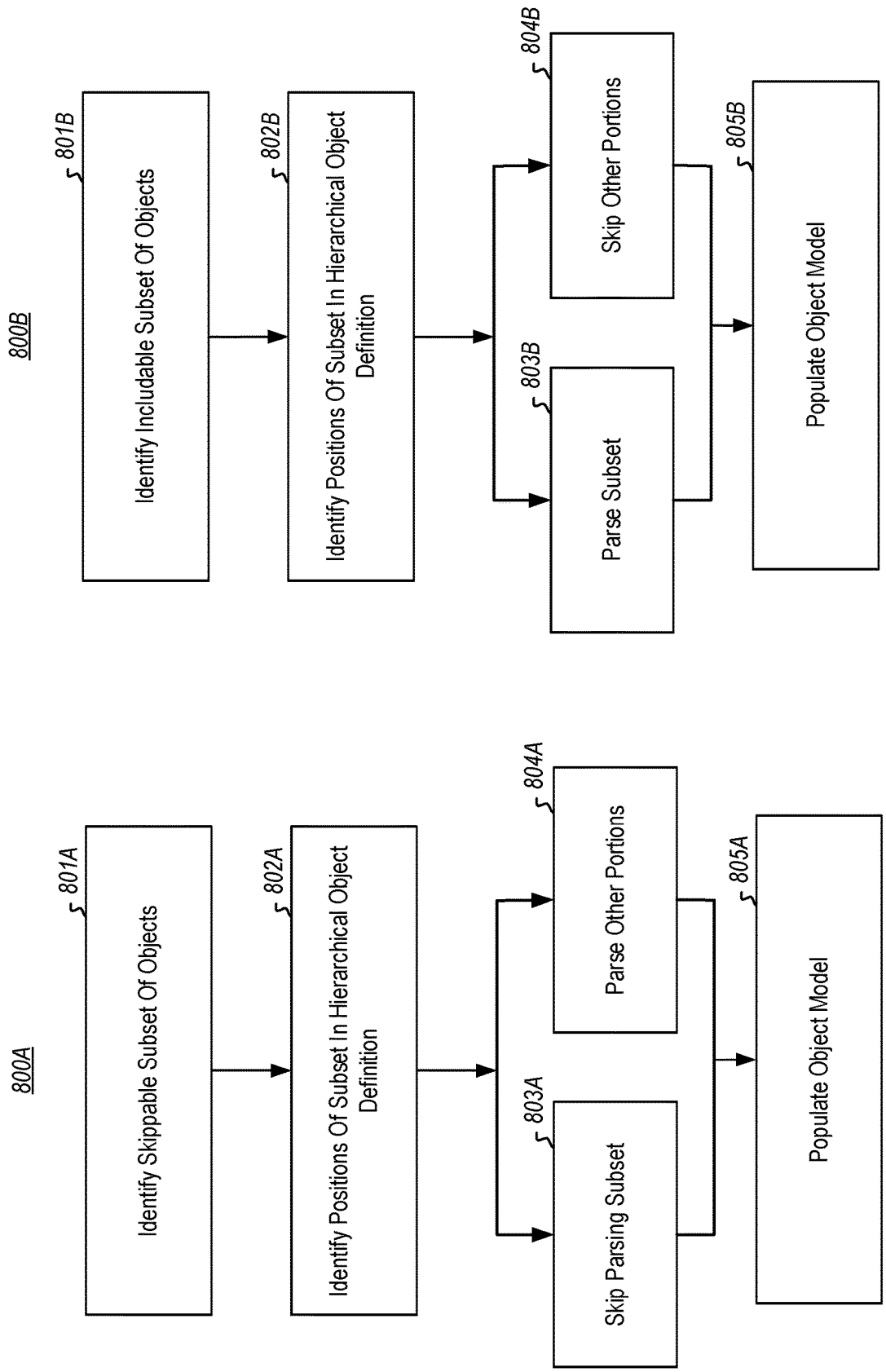
FIG. 8A illustrates a flowchart of a method for initially constructing the deferred object model skipping a subset of objects, in accordance with the principles described herein.
FIG. 8B illustrates a flowchart of a method 800B for initially constructing the deferred object model including only a subset of objects, in accordance with the principles described herein.

FIG. 8A illustrates a flowchart of a method 800A for initially constructing the deferred object model skipping a subset of objects, in accordance with the principles described herein. The method 800A includes detecting selection of a skippable subset of the objects of the hierarchical object definition to skip construction of in deferred form in the initial construction of the deferred object model (act 801A). To construct the deferred object model 620A of FIG. 6A, the method 800A may have identified the skippable subset of objects as including objects 323, 324 and 325.

The method 800A further includes using the map to identify a position of the object definitions of the skippable subset of the object within the hierarchical object definition (act 802A). Referring to FIG. 7, the system uses the map 730 (and particularly the entries 733 through 735) to identify the positions of the object definitions 213, 214 and 215 within the hierarchical object definition 710. The system then skips parsing of these identified positions (act 803A), and instead parses at least a portion of the remaining positions of the hierarchical object definition (act 804A) to populate the deferred object model with a deferred form of at least some of the objects that are not in the skippable subset (act 805A).

As an example, the system skips parsing of object definitions 213, 214 and 215, but parses object definitions 211 and 212, to thereby construct the deferred object model 620A with the deferred objects 621A and 622A that represent the deferred forms of respective objects 321 and 322.

Alternatively, or in addition, instead of identifying a skippable subset of objects to omit from the deferred object model, the system could instead affirmatively identify an includable subset of objects to include in the deferred object model. For instance, FIG. 8B illustrates a flowchart of a method 800B for initially constructing the deferred object model including only a subset of objects, in accordance with the principles described herein. The method 800B includes detecting selection of an includable subset of the objects of the hierarchical object definition to include in deferred form in the initial construction of the deferred object model (act 801B). To construct the deferred object model 620A of FIG. 6A, the method 800A may have identified the includable subset of objects as including objects 321 and 322.

The method 800B further includes using the map to identify a position of the object definitions of the includable subset of objects within the hierarchical object definition (act 802B). Referring to FIG. 7, the system uses the map 730 (and particularly the entries 731 and 732) to identify the positions of the object definitions 211 and 212 within the hierarchical object definition 710. The system then parses these identified positions (act 803B), and skips parsing at least a portion of the remaining positions of the hierarchical object definition (act 804B) to populate the deferred object model with a deferred form of at least some of the objects that are in the includable subset (act 805B). As an example, the system parses object definitions 211 and 212, but skips parsing of object definitions 213 through 215, to thereby construct the deferred object model 620A with the deferred objects 621A and 622A that represent the deferred forms of respective objects 321 and 322.

Because the parser does not parse all of the hierarchical object definition at initial construction time, the load time of the deferred object model is significantly reduced. Later, when the deferred object model is actually used, the deferred object model may be further populated.

As an example, suppose in FIG. 6A, the external component 330 uses the interface 310 to instruct that an operation be performed on the object 323, which is not even in deferred form in the object model 620A. The deferred object model 620A detects that an operation on the object 323 is requested, and then uses the map to determine a position of the corresponding object definition (e.g., object definition 213 in the hierarchical object definition 710). The parser is then caused to parse that position thereby offering up the object definition 213 to the constructor, which then constructs the requested object 323. Next, after the object 323 is used, the object could perhaps be discarded with a deferred form (e.g., deferred object 623B of FIG. 6B) being populated into the deferred object model. In that case, the result would be the deferred object model 620B of FIG. 6B.

Continuing the example, suppose in FIG. 6B, that the external component 330 then uses the interface 310 to instruct that an operation be performed on the object 324, which is also not represented (even in deferred form) in the object model 620B. The deferred object model 620B detects that an operation on the object 324 is requested, and then uses the map to determine a position of the corresponding object definition (e.g., object definition 214 in the hierarchical object definition 710). The parser is then caused to parse that position thereby offering up the object definition 214 to the constructor, which then constructs the requested object 324. Next, after the object 324 is used, the object could perhaps be included within the object model. In that case, the result would be the deferred object model 620C of FIG. 6C.

Figure 9:
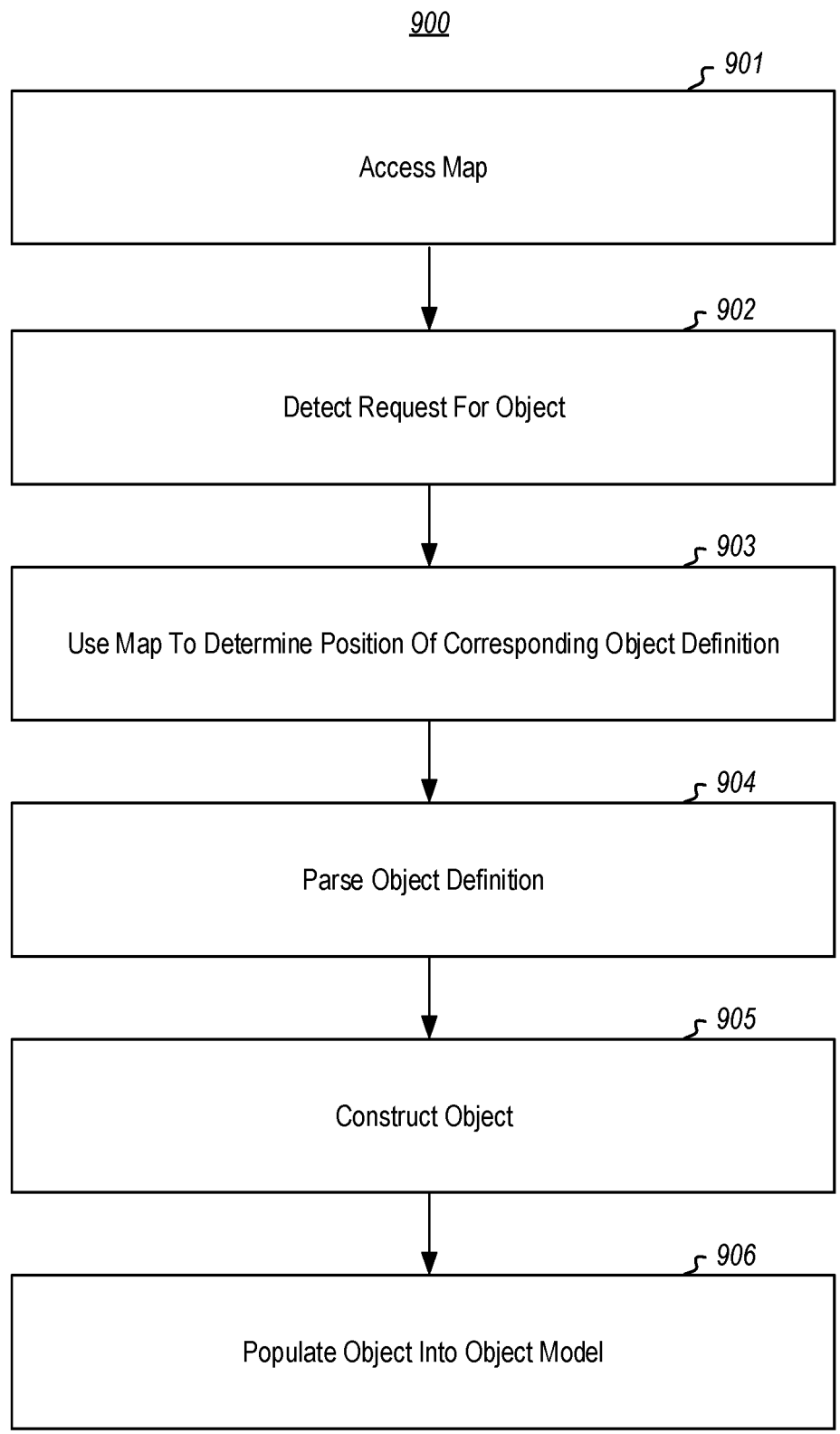
FIG. 9 illustrates a flowchart of a method for further populating a deferred object model that does not include a deferred form of all of the objects described in a hierarchical object definition from which the deferred object model was constructed.

More generally speaking, FIG. 9 illustrates a flowchart of a method 900 for further populating a deferred object model that does not include a deferred form of all of the objects described in a hierarchical object definition from which the deferred object model was constructed. Again, this further population is performed by accessing the hierarchical map (act 901). Upon detecting that an object is requested that is not in deferred form in the deferred object model (act 902), the map is used to determine a position of a corresponding object definition in the hierarchical object definition (act 903). In response to the determination of this position, the corresponding object definition is accessed and parsed (act 904). The requested object is then constructed (act 905). If the object is then to be included within the object model, the constructed object is then populated into the deferred object model (act 906).

An example of an entry of a hierarchical map will now be described with respect to what will be referred to herein as a "log example". In the log example, suppose that the hierarchical object definition is a JSON document that contains a log having two runs called Run A and Run B, and that each run has results, artifacts, and codeflows. Each run could be represented as an object in the object model. As an example, object 321 of the object model 720 could be a parent object called "Log", object 322 of object model 720 could represent Run A, and object 323 of the object model 720 could represent run B. Each run could have an entry within the map that tells where in the JSON document each run is positioned. In an example, the entry could thus read as follows for the particular run called "Run A":

Run A
  Hierarchical Position: Log\RunA
    Start Address: 58,280
    Length: 154,654

This map entry tells where Run A is located within the JSON document. Thus, to construct Run A in the object model whether in actual form or deferred form, the parser would parse 154,654 bytes beginning at byte address 58,280 to obtain the Run A object definition. The constructor would take the parsed Run A object definition and build the Run A object or the Run A deferred object. Alternatively, to skip construction of Run A, the parser can skip parsing beginning from byte address 58,280 for the next 154,654 bytes.

In one embodiment, the object could be a collection of indexed elements, such as an array. In this case, the correlated positions could be expressed for the indexed elements (e.g., for the array elements themselves). For instance, in the log example, Run A (e.g., object 322) could contain a child array (e.g., object 325) called Results that could be an index having a large number of elements. The following is an example representation of an entry for the Results array within the map.

Results A
  Hierarchical Position: Log\RunA\Results
    Start Address: 58,288
    Length: 154,254
    Count: 521
    ElementStarts: [58288, 310, 299, 270, 260, . . . ]

In the above example, the positions for each element are provided within the ElementStarts array. The first element of the ElementStarts array gives the byte address for the first element. The remaining elements of the ElementStarts array gives the relative byte offset. From this information, the system can determine that Results[0] begins at byte address 58288 and is 310 bytes long, Results[1] begins at byte address 58,598 (i.e., 58,288+310) and is 299 bytes long, and so forth. Thus, if Result[1] is identified as an object to be populated (whether in actual or deferred form) within a deferred object model, the system would parse 299 bytes from byte address 58,598 in the JSON document, provide the Results[1] object definition to the constructor, whereupon Results[1] would be constructed and populated into the deferred object model.

The count is helpful as it allows the results to be rendered appropriately on screen. For instance, the scroll bar can be rendered properly given the position of the array elements being displayed. As an example, if results from Results[240] to Results[270] are displayed, then a proper scroll bar can be displayed showing the user that they are displaying a position about halfway through the array, and displaying about 6 percent of the array results. This is true even if far less than all of the Results array elements are within the object model.

In one embodiment, the ElementStarts positions can be provided not for every indexed element—but at regular indices of the collection (e.g., every 5 elements). The following is an example that would enable this.

Results A
  Hierarchical Position: Log\RunA\Results
    Start Address: 58,288
    Length: 154,254
    Count: 521
    ElementStarts: [58288, 1540, 1588 . . . ]
    Every: 5

Here, the entry further identifies the index interval (i.e., every five elements). Thus, to get to Results[7], the system would find the closest prior indexed element for which there is a start address determinable from the entry. Here, the start address for Results [0] would again be byte address 58,288, and the start address for Results[5] would be 1540 bytes after that, or byte address 59,928. The system could then parse from this point until the object description for Results [7] is encountered and fully parsed. Thus, the Results[7] object description could be provided to the constructor, to construct Results[7] and populate Results[7] into the object model. This embodiment requires a little more parsing, but also lets the map be smaller.

Accordingly, a hierarchical map has been described that allows for a deferred object model to be initially constructed in only partial form, with additional just-in-time parsing performed as objects are needed. Thus, the principles described herein allow for faster load times, while still providing the appearance after that initial load that the entire object model has always been available. The hierarchical map may also be used for other purposes, as it may contain sufficient information to respond to some types of queries. As an example, if there is a query for the number of results for all runs, this can be quickly determined using only the hierarchical map, without the need to perform analysis on the object model itself. Thus, the hierarchical map has a number of uses.

The map can be constructed at any point after the underlying hierarchical object description (e.g., the dataset) comes into existence. In one embodiment, the map is built so as to restrict its size as compared to the underlying hierarchical object description. As an example, an executable component is configured to determine a size approximation that the map should be (e.g., 2 percent of the size of the hierarchical object description). This allows the executable component to determine how to construct the map. For instance, the executable component may determine that it should not include start addresses for every element in an array, but instead should include only start addresses for every so many elements (e.g., every five elements).

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system that loads a deferred object model without initially loading all objects of the deferred object model and without having to fully parse a hierarchical object definition that defines the deferred object model, the computing system comprising:
   one or more processors; and
   one or more computer-readable hardware storage devices that store instructions that are executable by the one or more processors to cause the computing system to:
      initially load only a portion of a deferred object model into memory by:
         accessing a map that correlates positions of a hierarchical object definition and corresponding hierarchical positions within an object model, wherein:
            the hierarchical object definition includes a plurality of object definitions that each describe a corresponding object and a hierarchical position of the corresponding object within the object model such that a plurality of objects are included in the object model,
            each object in the plurality of objects has a corresponding entry in the map, and a first object in the plurality of objects is represented as an array of elements and is represented as a particular entry in the map,
            the particular entry includes memory position data for some, but not all, of the elements in the array, where those elements that do have memory position data in the particular entry are spaced apart from one another in accordance with a regular index, thereby enabling the map to use relatively less memory as a result of not having memory position data for all of the elements in the array, and
            positions of entries in the map are controlled so that positions of any two of the entries, in terms of memory spacing, are set so as to not exceed a predetermined distance apart from one another; and
         initially constructing the deferred object model of the object model using the map to parse only a subset of the plurality of object definitions included in the hierarchical object definition, thereby constructing only some deferred objects of the deferred object model, and including only deferred stubs for others, thereby reducing load time of the deferred object model as compared to completely loading the deferred object model.

2. The computing system in accordance with claim 1, the initial construction of the deferred object model comprising:
   detecting selection of a skippable subset of the objects of the hierarchical object definition to skip construction of the skippable subset of the objects even in deferred form;
   using the map to identify positions of the object definitions of the skippable subset of the object within the hierarchical object definition;
   skipping parsing of the identified positions; and
   parsing at least a portion of remaining positions of the hierarchical object definition to populate the deferred object model with a deferred form of at least some of the objects that are not in the skippable subset.

3. The computing system in accordance with claim 1, the initial construction of the deferred object model comprising:
   detecting selection of an includable subset of the objects of the hierarchical object definition to include in deferred form in the initial construction of the deferred object model;
   using the map to identify positions of the object definitions of the includable subset of the objects within the hierarchical object definition;
   parsing the identified positions to populate the deferred object model with a deferred form of the objects that are in the includable subset; and
   skipping parsing at least a portion of remaining positions of the hierarchical object definition.

4. The computing system in accordance with claim 1, the initial construction of the deferred object model comprising:
   detecting selection of a particular object of the hierarchical object definition, the particular object being selected as to be skipped or included in the deferred object model;
   using the map to identify a position of the particular object in the hierarchical object definition;
   if the selection of the particular object indicates that construction of a deferred form of the particular object is to be skipped in the initial construction of the deferred object model, skipping parsing of the hierarchical object definition at the identified position; and
   if the particular object of the hierarchical object definition is selected to be included in the hierarchical object definition, parsing the identified position to populate the deferred object model with a deferred form of the particular object.

5. The computing system in accordance with claim 4, the correlated positions including a position of an indexed element of a collection of indexed elements.

6. The computing system in accordance with claim 5, at least some of the correlated positions of the indexed elements being expressed using relative offsets from other indexed elements of the collection.

7. The computing system in accordance with claim 5, the map further comprising a count of the indexed elements of the collection of indexed elements.

8. The computing system in accordance with claim 4, the correlated positions including positions of indexed elements at regular indices of a collection of indexed elements.

9. The computing system in accordance with claim 8, the regular indices being every indices such that the correlated positions include a position of all indexed elements of the collection of indexed elements.

10. The computing system in accordance with claim 8, the map further includes an identification of an index interval of the regular indices.

11. The computing system in accordance with claim 1, the computing system being further configured to do the following after having initially constructed the deferred object model and upon detecting that an object is requested that is not in deferred form in the deferred object model:
   using the map to determine a position of a corresponding object definition in the hierarchical object definition;

in response to the determination of the position of the corresponding object definition, accessing a parsing the corresponding object definition; and constructing the requested object using the parsed corresponding object definition.

12. The computing system in accordance with claim 11, wherein the deferred object model is populated with either the requested object or a deferred form of the requested object.

13. The computing system in accordance with claim 1, the correlated positions of the hierarchical object definition including positions that occur at regular intervals within the hierarchical object definition.

14. The computing system in accordance with claim 1, the correlated positions of the hierarchical object definition also including positions of object definitions that are larger than a predetermined size.

15. The computing system in accordance with claim 1, the executable instructions being further structured such that the computing system is configured to construct the map to be a relative size as compared to a size of the hierarchical object definition.

16. The computing system of claim 1, wherein said parsing includes parsing the first object, and wherein parsing the first object includes:

selecting, for parsing, a particular element that does not have memory position data in the particular entry;

finding a closest, prior element that does have memory position data in the particular entry; and begin parsing from the memory position data of the closest, prior element and continue parsing until the particular element is encountered and subsequently fully parsed.

17. A method for loading a deferred object model without initially loading an entirety of the deferred object model and without having to fully parse a hierarchical object definition that defines the deferred object model, the method comprising:

accessing a map that correlates positions of a hierarchical object definition and corresponding hierarchical positions within an object model, wherein:

the hierarchical object definition includes a plurality of object definitions that each describe a corresponding object and a hierarchical position of the corresponding object within the object model such that a plurality of objects are included in the object model, each object in the plurality of objects has a corresponding entry in the map, and a first object in the plurality of objects is represented as an array of elements and is represented as a particular entry in the map, the particular entry includes memory position data for some, but not all, of the elements in the array, where those elements that do have memory position data in the particular entry are spaced apart from one another in accordance with a regular index, thereby enabling the map to use relatively less memory as a result of not having memory position data for all of the elements in the array, and positions of entries in the map are controlled so that positions of any two of the entries, in terms of memory spacing, are set so as to not exceed a predetermined distance apart from one another; and initially constructing a deferred object model of the object model using the map to parse only a subset of the plurality of object definitions included in the hierarchical object definition, thereby constructing only some deferred objects of the deferred object model, thereby reducing load time of the deferred object model as compared to completely loading the deferred object model, wherein said parsing includes parsing the first object, and wherein parsing the first object includes:

selecting, for parsing, a particular element that does not have memory position data in the particular entry;

finding a closest, prior element that does have memory position data in the particular entry; and begin parsing from the memory position data of the closest, prior element and continue parsing until the particular element is encountered and subsequently fully parsed.

18. The method in accordance with claim 17, the initial construction of the deferred object model comprising:

detecting selection of a skippable subset of the objects of the hierarchical object definition to skip construction of the skippable subset of the objected even in deferred form;

using the map to identify positions of the object definitions of the skippable subset of the object within the hierarchical object definition;

skipping parsing of the identified positions; and parsing at least a portion of remaining positions of the hierarchical object definition to populate the deferred object model with a deferred form of at least a some of the objects that are not in the skippable subset.

19. The method in accordance with claim 17, the initial construction of the deferred object model comprising:

detecting selection of an includable subset of the objects of the hierarchical object definition to include in deferred form in the initial construction of the deferred object model;

using the map to identify positions of the object definitions of the includable subset of the objects within the hierarchical object definition;

parsing the identified positions to populate the deferred object model with a deferred form of the objects that are in the includable subset; and skipping parsing at least a portion of remaining positions of the hierarchical object definition.

20. The method in accordance with claim 17, the correlated positions including a position of an indexed element of a collection at regular indices of indexed elements, at least some of the correlated positions of the indexed elements being expressed using relative offsets from other indexed elements of the collection, the map further comprising a count of the indexed elements of the collection of indexed elements, and an identification of an index interval of the regular indices.

21. A method for further populating a deferred object model that does not include a deferred form of all objects described in a hierarchical object definition from which the deferred object model was constructed, said method comprising:

accessing a map that correlates positions of a hierarchical object definition and corresponding hierarchical positions within an object model, wherein:

the hierarchical object definition includes a plurality of object definitions that each describe a corresponding object and a hierarchical position of the corresponding object within the object model such that a plurality of objects are included in the object model, each object in the plurality of objects has a corresponding entry in the map, and a first object in the plurality of objects is represented as an array of elements and is represented as a particular entry in the map, the particular entry includes memory position data for some, but not all, of the elements in the array, where those elements that do have memory position data in the particular entry are spaced apart from one another in accordance with a regular index, thereby enabling the map to use relatively less memory as a result of not having memory position data for all of the elements in the array, and positions of entries in the map are controlled so that positions of any two of the entries, in terms of memory spacing, are set so as to not exceed a predetermined distance apart from one another;

detecting that an object is requested that is not in deferred form in the deferred object model;

using the map to determine a position of a corresponding object definition in the hierarchical object definition;

in response to determining the position of the corresponding object definition, accessing and parsing the corresponding object definition;

constructing the requested object using the parsed corresponding object; and parsing the first object by performing the following:
  selecting, for parsing, a particular element that does not have memory position data in the particular entry;
  finding a closest, prior element that does have memory position data in the particular entry; and
  begin parsing from the memory position data of the closest, prior element and continue parsing until the particular element is encountered and subsequently fully parsed.

* * * * *